Nov. 25, 1952 E. D. SHIPPEE 2,619,442
REINFORCED FRICTION ELEMENTS
Filed Aug. 20, 1949

INVENTOR
EDGAR D. SHIPPEE.
BY Virgil C. Kline
ATTORNEY

Patented Nov. 25, 1952

2,619,442

UNITED STATES PATENT OFFICE 2,619,442

REINFORCED FRICTION ELEMENT

Edgar D. Shippee, Piscataway Township, Middlesex County, N. J., assignor to Johns-Manville Corporation, New York, N. Y., a corporation of New York Application August 20, 1949, Serial No. 111,445

4 Claims. (Cl. 154—52)

This invention relates to reinforced friction elements, and more particularly to wire fabric reinforced composition brake linings, clutch facings and the like.

It is customary to manufacture brake linings and other friction elements employing moldable compositions including asbestos or other heat resistant fibrous material, friction imparting ingredients, and binders such as rubber or resin. The binders employed are usually such as require curing by heat, or heat and pressure. It is desirable to have sufficient flexibility in the uncured friction element to enable it to be fitted or shaped to surfaces of varying degrees of curvature. A wire mesh reinforcing is frequently employed to impart sufficient strength to the product to withstand the stresses developed during manufacture and under service conditions.

A primary object of the invention is to provide an improved form of flexible wire fabric reinforced composition friction element which is adapted for severe service.

In the conventional type of galvanized or ungalvanized woven wire mesh which has been heretofore employed for reinforcing composition friction elements, a structural limitation is that the wire diameter must increase with the size of the mesh openings. If a conventional woven wire fabric is viewed in cross sections of the fill or weft wires, with the warp wires threaded through, it will be observed that each leg of a bend in a warp wire must form an oblique angle with the other leg and with the plane of the fabric, such as to prevent the fill wires from sliding toward or away from each other. The size of this oblique angle is directly governed by the diameter of the wires themselves, in ratio to the size of the open mesh area.

A feature of the present invention resides in the substitution of a knitted wire fabric in place of the conventional woven wire fabric, as the reinforcing backing for a conventional composition friction element.

When a conventional woven wire backing is used to reinforce a composition brake lining, the maximum strain developed in flexing said brake lining prior to heat cure occurs at or near only the wear surface of the lining, since the metal mesh backing member is so stiff in structure as to resist contraction, and accordingly the neutral plane of zero stress lies within the wire mesh member. The knitted wire reinforcing element which is employed as a backing reinforcement for friction elements in accordance with the present invention, has sufficient longitudinal flexibility as to permit the knitted wire backing to flex to conform to desired annular or curved shapes without stretching or substantially altering the cross sectional area of the body thereof. The greater flexibility exhibited by the knitted wire reinforcing elements when subjected to stresses applied in parallel to the longitudinal axis of the reinforced member, is due to a compensating relative sliding action of the interengaged knit wire loops of the reinforcing fabric, whereby any portions of the fabric subjected respectively to longitudinal stretch and compression, may simultaneously elongate or shorten, without subjecting the metallic wire from which the fabric is made to undue bending, stretching or compression strains or stresses. Thus with a knitted wire backing for a composition brake lining or equivalent friction element, the maximum strain developed for any given degree of flexing is minimized by the ability of the knitted wire element to elongate or contract, so that the absolute magnitude of the strains on the back and wear surfaces of the uncured lining are nearly equal, and the neutral stress plane lies near the plane through the transverse sectional center of the lining. In other words, by using a knitted wire fabric as a reinforcing member for a composition friction element having relatively poor green or uncured strength, it is possible to subject such element to flexing or other stresses within a substantially wide latitude, by reason of the fact that the knitted wire reinforcing has sufficient flexibility to adapt itself to any flexing distortions developed at the unreinforced face of the composite element.

A feature of the knitted wire reinforced composition friction elements forming the subject of the present invention, is that they permit a much wider latitude in composition and in methods of formulation, since they are not adversely affected to any serious extent by flexing strains developed in the uncured element prior to heat cure. The knitted wire backing allows the material to be flexed to a greater extent without cracking the lining, or to permit of flexing a weaker composition to the same extent, since the lining can deform both at the back and at the wear face.

In view of the fact that the reinforcing members commonly employed as backings for brake linings or other friction elements are metallic, while the intermixed ingredients forming the main body of the friction elements comprise asbestos and other organic and inorganic material in original fine particle form, the composition body and the wire mesh backing usually have different coefficients of expansion. Since the cure of the rubber or other bonding element in such friction element is usually effected by heat, with or without pressure, a common point of weakness in conventional wire mesh reinforced brake elements lies in their tendency to develop warping, cracking or curling defects during the heat cure or during severe high temperature service. When a wire mesh reinforced brake lining develops warping, as by bowing transversely of its main longitudinal axis, additional grinding or rolling operations are required to reshape the element to the wearing shape of the surface which must be engaged in service. The rapidly changing alternate heating and cooling cycles to which the friction elements are subjected in service, over substantial temperature ranges, frequently has the effect of causing conventional wire reinforced elements to curl away from the supports to which they are secured, particularly at points adjacent to the edges of the elements. Both the warping and curling tendencies of wire mesh reinforced brake linings seriously impair the service life and the service efficiency of such elements, and create other objectionable operating defects including excessive vibration chatter.

In the following description reference will be made to the accompanying drawings, in which Fig. 1 is a fragmentary elevational view of the wearing face of a composition brake lining, with part of the composition body broken away to the right of the line A—A to disclose the knitted wire backing incorporated therein as reinforcement;

Figure 4:
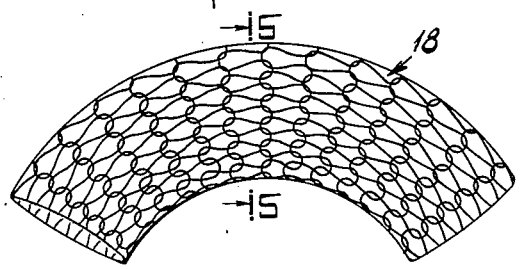
Figure 5:
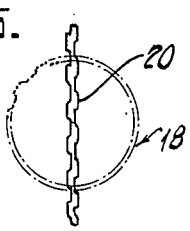

Fig. 4 is a fragmentary elevation of a two-ply flattened tubular knitted wire fabric disposed in annular form, such view illustrating the sliding play between interengaged knit loops of the metallic mesh fabric imparting longitudinal flexibility or pliability thereto without stressing or straining the metallic wire of which the fabric is formed; and Fig. 5 is a schematic sectional view taken on the line 5—5 of Fig. 4, illustrating flattening from tubular form.

Figure 1:
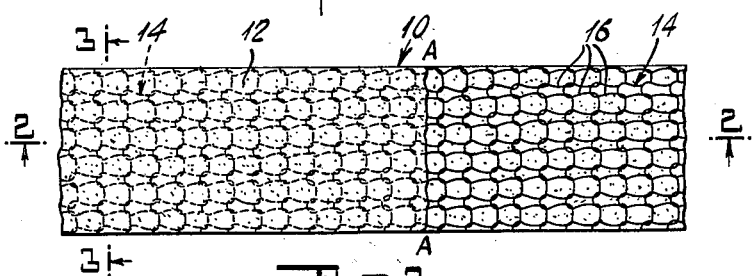
Figure 2:
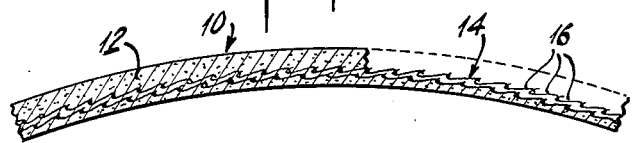
Fig. 2 is a longitudinal sectional view taken on the line 2—2 of Fig. 1.
Figure 3:
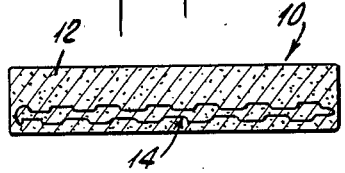
Fig. 3 is a transverse sectional view taken on the line 3—3 of Fig. 1.

Referring particularly to Figs. 1, 2 and 3, the wire fabric backed brake lining 10 therein portrayed includes a composition body 12 and a knitted wire backing reinforcement 14 embedded at or adjacent the back face thereof. Since this type of metal wire reinforcement is primarily useful in brake linings or other frictional elements where the bond of the composition body 12 is developed by heat cure, the composition body normally includes as a binder heat curable strength imparting materials such as vulcanizable rubber mixtures, or thermosetting resins of the phenol- or urea-formaldehyde type. The binder may also, of course, incorporate drying oils, or drying oil modified phenolic resins, or other heat reactive resins.

In contrast to the comparatively inflexible construction of conventional woven wire mesh, the knitted wire fabric 14 which is portrayed in the drawings is extremely flexible in its structural design, for the reason that the curvature of the loops 16 is independent of the wire diameter. The area of the reinforcing fabric 14 should substantially conform to the wear face area of the friction element 10 which is reinforced. In the fabric 14, interengaged wire loops 16 of uniform size are disposed in parallel lay, with major axes of the loops generally parallel to the principal axes of the friction element and fabric, permitting sliding play between longitudinally adjoined loops. As shown, a strip of knitted metallic wire fabric may be made up to any desired length and width. This strip preferably (see Fig. 5) comprises a tubular knit metallic fabric 18 which is flattened to provide a double ply strip 20, although satisfactory reinforcement fabrics for brake linings or clutch facings may comprise single ply knitted wire strips. Fig. 4 illustrates the flexibility imparted by the sliding play permitted between interengaged loops 16 of the metallic wire structure. Longitudinal flexibility or pliability is thereby imparted without substantially altering the cross-sectional dimensions, and without stressing and straining the metallic wire from which the fabric is constructed.

In addition to the binder, the composition body 12 may incorporate a wide variety of strength and friction imparting ingredients including asbestos or other fibrous material, particulate friction modifiers such as scrap vulcanized rubber and granular copper or brass, and inert filler material such as carbon black. A typical formula which may be followed in producing a suitable composition body for friction brake linings has the following approximate composition by weight:

| | Parts |
|---|---|
| Vulcanizable rubber | 15 |
| Particulate scrap rubber | 10 |
| Granular copper or brass | 5 |
| Asbestos | 69 |
| Vulcanizing agents, including sulphur | 1 |
| Rubber solvent | 30 |

In compounding friction elements according to the foregoing formula, the raw or partially vulcanized rubber is plasticized by the solvent, and thereafter the asbestos, the scrap rubber, the granular metal friction particles, and the vulcanizing agents are introduced into the plasticized rubber and very thoroughly dispersed and intermixed therein in a rubber mixer, to a doughy consistency. The mixture thus formed is then broken up into small pellets which are fed to the hopper of a roll calender into which is also fed knitted wire reinforcing fabric 14. In this manner the knitted wire fabric becomes embedded in the back of the brake lining extruded from the calender roll bite. As the mixture is fed through the bite between the rolls of the machine, the composition is packed into the mesh openings of the knitted wire backing. The continuous strip of knitted wire backed lining thus formed may be cut to suitable dimensions, shaped to final curvature, and then passed through a continuous bake oven wherein it is subjected to gradually increasing temperatures to heat-cure the vulcanized rubber or thermosetting resins to a final cured state.

Brake lining incorporating a knitted wire backing does not exhibit any marked tendency to curl while undergoing baking cure. Linings which have been press molded or otherwise given a correct shape, can be baked without curling. Furthermore, linings with knitted wire backing do not exhibit any serious tendency to warp during baking while being held in a frame only on the ends; and the use of knitted wire backing substantially reduces the tendency of the brake lining to crack as the lining shrinks during baking, or during wide temperature fluctuations under service conditions. The knitted wire tends to shrink with the resin or binder, rather than to hold the lining apart on the one side while the other side shrinks. The knitted wire construction permits sliding play between longitudinally adjoined loops in a direction parallel to the longitudinal axis of the body. Thus the knitted wire backing tends to contract with the composition lining undergoing heat shrinkage, and consequently there is no tendency toward development of small cracks in the lining or reduction of strength of the lining.

Another advantage in the use of knitted wire backing is that such backing imparts adequate rivet-holding strength, even though the wire caliper is much finer than that which would be used with a conventional woven wire backing. Comparative tests have shown that a knitted wire backed brake lining produced in accordance with the present invention and riveted to shoes, will withstand an ultimate shear load (in pounds applied to the curved edge of the lining in a direction tending to shear the lining away from a brake shoe facing) substantially the same as that of a lining of identical composition reinforced with conventional woven wire backing of adequate shear strength. Similar comparative tests have shown that a knitted wire backed brake lining produced in accordance with the present invention and bonded or cemented to shoes, will withstand an ultimate shear load substantially greater than that of a lining of identical composition reinforced with conventional woven wire backing. The brake linings which exhibited the greatest improvement in shear strength, when replacing a conventional woven wire backing with a knitted wire backing, were brake lining compositions having a greater tendency to shrink during baking cure. Thus the knitted wire permits a considerable amount of shrinkage, whereas the woven wire inhibits shrinkage. The knitted wire tends to contract with the shrinking brake block, and to thus reduce the formation of internal strains and fractures which tend to weaken the cured product.

In the knitted wire reinforcing fabric a greater degree of looseness of weave and a smaller size of wire is permissible than can be employed with a conventional woven wire of equivalent reinforcing value.

It will be understood that the invention applies generally to wire fabric reinforced friction elements, as for example to clutch facing of annular shape in which a knitted wire reinforcing fabric of the general structure portrayed in Fig. 4, is embedded in a suitable bonded composition body.

Since many variations may be made from the illustrative details given, without departing from the scope of the invention, it is intended that the invention should be limited only by the terms of the claims interpreted as broadly as consistent with novelty over the prior art.

What I claim is:

1. A relatively elongated friction element comprising a bonded composition body and a metallic reinforcing network, said network comprising a knitted metallic wire fabric embedded in said body and comprising interengaged wire loops lying substantially parallel to the longitudinal axis of the body wherein sliding play is permitted between longitudinally adjoined loops toward and from each other throughout the fabric mass, said metallic reinforcing network being positioned between the neutral stress plane positioned substantially at the transverse sectional center of said friction element and the surface of said element opposite its wear face.

2. A relatively elongated friction element comprising a bonded composition body and a metallic reinforcing network, said network comprising a two-ply flattened tubular knitted metallic wire fabric embedded in said body and comprising interengaged wire loops lying substantially parallel to the longitudinal axis of the body wherein sliding play is permitted between longitudinally adjoined loops toward and from each other throughout the fabric mass, said metallic reinforcing network being positioned between the neutral stress plane positioned substantially at the transverse sectional center of said friction element and the surface of said element opposite its wear face.

3. A relatively elongated molded friction element comprising a bonded composition body containing friction particles, asbestos fiber and a binder matrix, and a metallic reinforcing network, said network comprising a knitted metallic wire fabric embedded in said body and comprising interengaged wire loops lying substantially parallel to the longitudinal axis of the body wherein sliding play is permitted between longitudinally adjoined loops toward and from each other throughout the fabric mass, said metallic reinforcing network being positioned between the neutral stress plane positioned substantially at the transverse sectional center of said friction element and the surface of said element opposite its wear face.

4. A relatively elongated molded friction element comprising a bonded composition body containing friction particles, asbestos fiber and a binder matrix comprising a polymerized oil-modified phenolic resin, and a metallic reinforcing network, said network comprising a knitted metallic wire fabric embedded in said body and comprising interengaged wire loops lying substantially parallel to the longitudinal axis of the body wherein sliding play is permitted between longitudinally adjoined loops toward and from each other throughout the fabric mass, said metallic reinforcing network being positioned between the neutral stress plane positioned substantially at the transverse sectional center of said friction element and the surface of said element opposite its wear face.

EDGAR D. SHIPPEE.

REFERENCES CITED

The following references are of record in the file of this patent:

UNITED STATES PATENTS

| Number | Name | Date |
| --- | --- | --- |
| 1,225,336 | Jones | May 8, 1917 |
| 1,671,944 | Waite | May 29, 1928 |
| 2,052,808 | Spokes | Sept. 1, 1936 |
| 2,125,524 | Smith | Aug. 2, 1938 |
| 2,217,915 | Mehnert | Oct. 15, 1940 |
| 2,353,226 | Driscoll et al. | July 11, 1944 |
| 2,410,924 | Blume et al. | Nov. 12, 1946 |
| 2,439,586 | Sowerby et al. | Apr. 13, 1948 |